Dec. 12, 1939.  L. J. KOMORA  2,182,923
REGISTER
Filed March 17, 1939
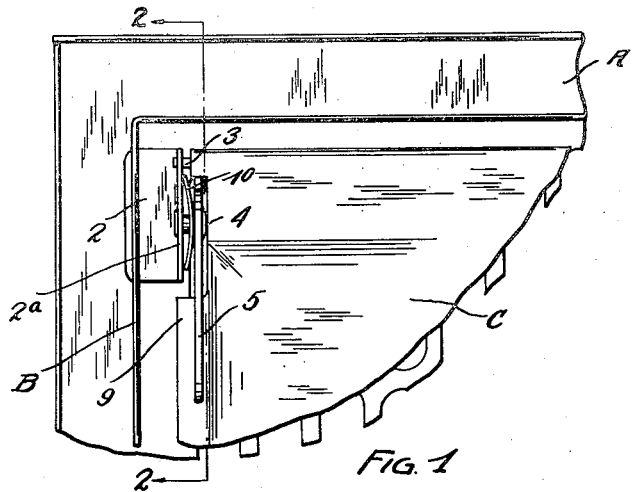
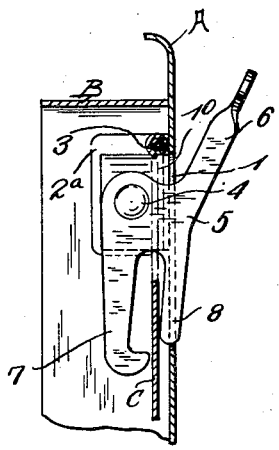
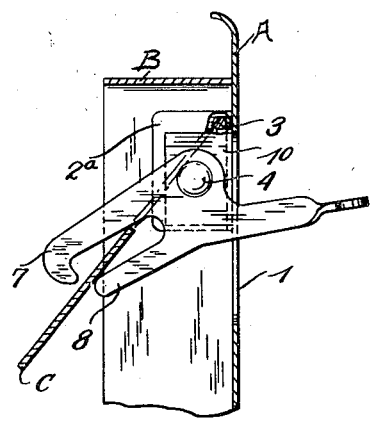
INVENTOR.
Louis J. Komora
BY
Robbs Ross
ATTORNEYS

Patented Dec. 12, 1939

2,182,923

UNITED STATES PATENT OFFICE

2,182,923

REGISTER

Louis J. Komora, East Cleveland, Ohio, assignor to The Auer Register Company, Cleveland, Ohio Application March 17, 1939, Serial No. 262,553

2 Claims. (Cl. 98—106)

This invention has to do with heat or air conditioning systems, and particularly with the construction of registers or grills such as are to be located in the side walls or baseboards of rooms, or the like.

The purpose of the invention is to provide a simplified means for holding the deflector or shutter member associated with the grill section of the register in adjusted positions for controlling the flow of heated or air-conditioned air through the grill section, or for cutting off the flow entirely.

In the carrying out of the invention the deflector or shutter member is pivotally mounted in the usual manner at the upper portion of the grill section and there is provided a hand lever projecting through the grill section to a position in front thereof for convenient manipulation. The said lever is pivotally mounted on a bracket which also forms a pivotal support for the deflector or shutter member, and a spring friction plate is interposed between the lever and the said bracket so as to apply to the lever sufficient friction under all conditions of its operating movement to hold the same stationary along with the deflector itself, upon discontinuing said operating movement.

The invention involves detail features of construction in addition to those above described generally, all of which will appear more fully in the following description and accompanying drawing, in which:

Figure 1 is a rear elevation of a register, looking from the rear thereof and illustrating the grill section, rear frame member, and deflector, partly broken away, the emphasis of the illustration being upon the actuating lever and detent friction spring parts.

Figure 2 is a sectional view taken upon the line 2—2 of Figure 1, looking in the direction of the arrow.

Figure 3 is a view similar to Figure 2, but showing the deflector partly open instead of closed as in Figure 2.

Specifically describing the invention, A in the drawings illustrates the grill section or plate of the register which, as is well known, is the front finishing member of the unit, said grill section being provided with the grill openings 1 for passage of the air from a flue or other passage, into the room. Applied to the rear side of the grill section A is the usual rectangular frame member B, a corner portion of which is shown in the drawings, and this frame member performs the usual function of providing a seat portion or bearing for the mounting of the grill plate or section in a wall or baseboard, or the like.

Welded or otherwise secured to the rear face of the grill section A is a bracket plate 2 of L-form, having a flange 2a projecting rearwardly from the member A and provided with a bearing opening receiving the pintle 3 at one end of the deflector or shutter member C. The opposite end of the deflector C, in line with the pintle member 3, has a pintle bearing in another bracket on the grill section, this feature not being shown because immaterial to the invention. However, in the above manner the deflector is mounted for free pivotal movement relative to the supports of its pintle parts, including the bracket 2.

Secured to the bracket 2 by means of a suitably headed rivet fastening 4 is an operating lever 5 through which the said fastening also passes. The deflector C is shifted pivotally by said operating lever to open and close the same in relation to the openings 1 of the grill section A. The lever 5 is somewhat peculiarly formed to provide the handle arm 6 and the spaced bifurcations 7 and 8 at the lower end opposite the end having the handle 6.

The fastening member 4 passes through the middle portion of the lever 5 and the said lever is arranged therefore to turn about the fastening 4 as an axis. However, the bifurcations of the lever are caused to straddle the upper cutaway portion 9 of the deflector C and to have a sort of sliding bearing thereon to obtain the necessary connection for shifting the deflector when the lever 6 is tilted pivotally about its axis 4.

Now to hold the lever 5 and the deflector C in adjusted positions, there is interposed between the outer side of the lever 5 and the adjacent side of the flange 2a of the bracket 2 a spring friction plate 10. This plate is formed on a fixed curved arc and its ends bear against the flange 2a while its middle portion bears against the side of the lever 5. The fastening 4 passes through the plate 10 and holds it from displacement. The degree of spring tension to be exerted by the plate 10 is calibrated suitably in the manufacture of these members 10, and the parts 5, 10 and 2 are assembled by means of the connection established between them by the headed rivet 4.

The handle 6 of the lever extends through one of the grill openings 1 near the upper portion of the grill section A so that no special opening is necessary to be formed in the latter for the purposes of use of the operating device described.

The invention of the specific means for actuating the deflector or shutter member C is simple, easy to manufacture, and readily to be assembled in the register or grill unit according to the disclosure herein.

As seen in Figure 2, the deflector or shutter member C is closed, being adjusted as closely to the grill section A as practicable, whereas it will be apparent that by downward pressure on the fingerpiece of the handle member, the lever 5 will be rocked inwardly and the outer bifurcation 8 thereof contacting the member C will swing it open and maintain it open. Movement of the lever 5 upwardly to reassume the position of Figure 2 or intermediate positions between those of Figures 2 and 3 causes the outer bifurcation 7 to engage and frictionally shove the deflector C toward its closed position against the grill section A.

Having thus described my invention, what I claim as new and desire to secure by Letters Patent of the United States, is:

1. A register unit as described, comprising a grill section, a bracket plate attached to the rear side of said section and having a pintle opening, a deflector movable toward and from the rear side of the grill section and having a pintle member entering said pintle opening, an operating lever projecting through the grill section and formed with a handle member externally to the latter and also formed with spaced bifurcations at its end opposite the handle member, a pivotal fastening between the said lever at its middle portion, and the said bracket plate permitting shifting movement of the register and the deflector, and a curved spring friction plate interposed between the lever and the bracket plate and through which the said fastening passes, by which friction plate the lever and deflector are held in adjusted positions after movement.

2. In a register unit of the class described, in combination, a grill section, a deflector pivotally mounted at the rear of said section to move toward and from the grill openings of the grill section, and a device for shifting the deflector relatively to the grill section consisting of a lever pivotally supported in rear of the grill section, having a handle projecting outwardly from the grill section and having spaced portions adapted to contact with opposite sides of the deflector so that when the lever is moved pivotally it will swing the deflector either inwardly from the grill section or outwardly toward it by means of contact of the spaced members with the opposite sides of the deflector, the support for the deflector comprising a bracket plate receiving a pintle member of the deflector, and a spring friction plate interposed between the said bracket plate and the said operating lever for holding the operating lever and thereby the deflector engaged therewith at suitable adjustments between opening and closing positions.

LOUIS J. KOMORA.